United States Patent [19]

Tiberio

[11] Patent Number: 5,564,758
[45] Date of Patent: Oct. 15, 1996

[54] ANGLED PLATES FOR CONNECTING DUCTS

[75] Inventor: Joseph W. Tiberio, Sherborn, Mass.

[73] Assignee: Century Manufacturing Co., Inc., Holliston, Mass.

[21] Appl. No.: 373,336

[22] Filed: Jan. 17, 1995

[51] Int. Cl.⁶ .................................................. F16L 23/00
[52] U.S. Cl. ............................................ 285/405; 285/424
[58] Field of Search ...................................... 285/405, 364, 285/424; 403/295, 283

[56] References Cited

U.S. PATENT DOCUMENTS

| | | | |
|---|---|---|---|
| 2,857,635 | 10/1958 | Maple et al. | 403/283 |
| 3,321,223 | 5/1967 | Snow et al. | 403/295 |
| 3,866,380 | 2/1975 | Benson | 403/295 |
| 4,105,348 | 8/1978 | Anderson et al. | 403/295 |
| 4,357,744 | 11/1982 | McKenzie et al. | 403/295 |
| 4,542,923 | 9/1985 | La Crosse et al. | 285/364 |
| 4,572,553 | 2/1986 | Geldner | 285/424 |
| 4,683,634 | 8/1987 | Cole | 403/295 |
| 4,725,083 | 2/1988 | Schauer | 285/405 |

FOREIGN PATENT DOCUMENTS

| | | | |
|---|---|---|---|
| 546246 | 6/1993 | European Pat. Off. | 285/424 |
| 2501611 | 7/1976 | Germany | 285/424 |
| 3638618 | 5/1987 | Germany | 285/424 |

*Primary Examiner*—Eric K. Nicholson
*Attorney, Agent, or Firm*—John E. Toupal; Harold G. Jarcho

[57] ABSTRACT

An angular plate for connecting channel shaped flanges at the ends of ducts and including first and second legs each having substantially planar top and bottom surfaces and with an inner end portion of the first leg joined to an inner end portion of the second leg so as to establish an angle therebetween. Defined by the inner end portions is an opening for receiving a connector, the first leg has substantially parallel inner and outer edges extending between an outer end portion thereof and its inner end portion and the second leg similarly has substantially parallel inner and outer edges extending between an outer end portion thereof and its inner end portion. The outer end portion of the first leg defines structure projecting extending transversely from at least one of the inner and outer edges of at least one of the first and second legs. The projection engages a side wall portion of the duct's transverse flange to retain the plate in a desired position prior to crimping of the flange.

21 Claims, 2 Drawing Sheets

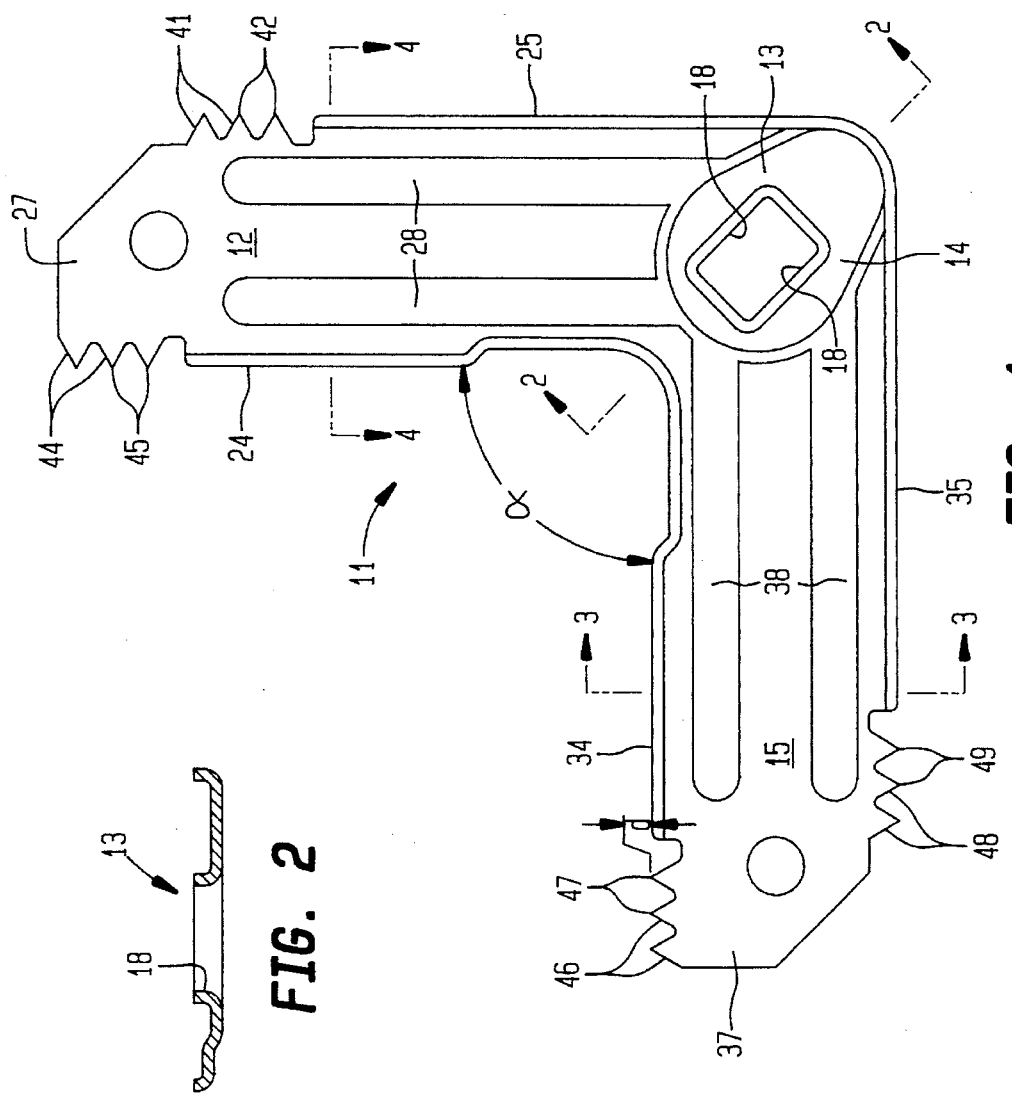

ANGLED PLATES FOR CONNECTING DUCTS

BACKGROUND OF THE INVENTION

This invention relates generally to angled plates for connecting linear sections of ducts and, more particularly, to angled plates for mounting in transverse channel flanges of duct sections.

Linear duct sections are commonly fabricated with ends having outwardly directed, transverse flanges used for joining adjacent sections. Angled plates are inserted manually into the transverse flanges at the corners of the duct sections and then fastened with bolts to join a pair of adjacent sections. Duct construction of that type is disclosed, for example, in U.S. Pat. Nos. 4,466,641 and 4,542,923. Also known is machinery for automatically inserting angled plates into duct flanges so as to reduce the labor intensiveness of duct assembly. A machine for that purpose is disclosed in U.S. Pat. No. 5,342,100.

One of the problems associated with the above described duct assembly is a tendency for inserted angled plates to slip before being secured in a desired position by crimping of the transverse duct flanges. The object of this invention, therefore, is to provide an angled plate that will remain in a desired corner position within transverse flanges of a duct section until a fastening operation can be achieved.

SUMMARY OF THE INVENTION

The invention is an angular plate for connecting channel shaped flanges at the ends of ducts and including first and second legs each having substantially planar top and bottom surfaces and with an inner end portion of the first leg joined to an inner end portion of the second leg so as to establish an angle therebetween. Defined by the inner end portions is an opening for receiving a connector, the first leg has substantially parallel inner and outer edges extending between an outer end portion thereof and its inner end portion and the second leg similarly has substantially parallel inner and outer edges extending between an outer end portion thereof and its inner end portion. The outer end portion of the first leg defines structure projecting extending transversely from at least one of the inner and outer edges of at least one of the first and second legs. The projection engages a side wall portion of the duct's transverse flange to retain the plate in a desired position prior to crimping of the flange.

According to one feature of the invention, the projecting structure extends transversely from each of the inner and outer edges of the first leg. This feature provides more secure retention of the plate.

According to another feature of the invention, the projecting structure constitutes transversely projecting teeth having pointed outer ends. Penetration of the duct's flanges by the pointed teeth establishes a fixed position for the plate.

According to yet another feature of the invention, the teeth project from the inner end outer edges by a distance of between 0.003 and 0.010 inches. This feature facilitates positioning and retention of the angular plate within the flange.

According to still another feature of the invention, the projecting structure includes teeth extending transversely from each of the first and second legs. An even more secure retention of the angular plate is provided by this feature.

BRIEF DESCRIPTION OF THE DRAWINGS

These and other objects and features of the invention will become more apparent upon a perusal of the following description taken in conjunction with the accompanying drawings wherein:

FIG. 1 is a plan view of an angled plate according to the invention;

FIG. 2 is a cross-sectional view taken along lines 2—2 of FIG. 1;

FIG. 3 is a cross-sectional view taken along lines 3—3 of FIG. 1;

FIG. 4 is a cross-sectional view taken along lines 4—4 of FIG. 1; and

DESCRIPTION OF THE PREFERRED EMBODIMENT

Figure 5:
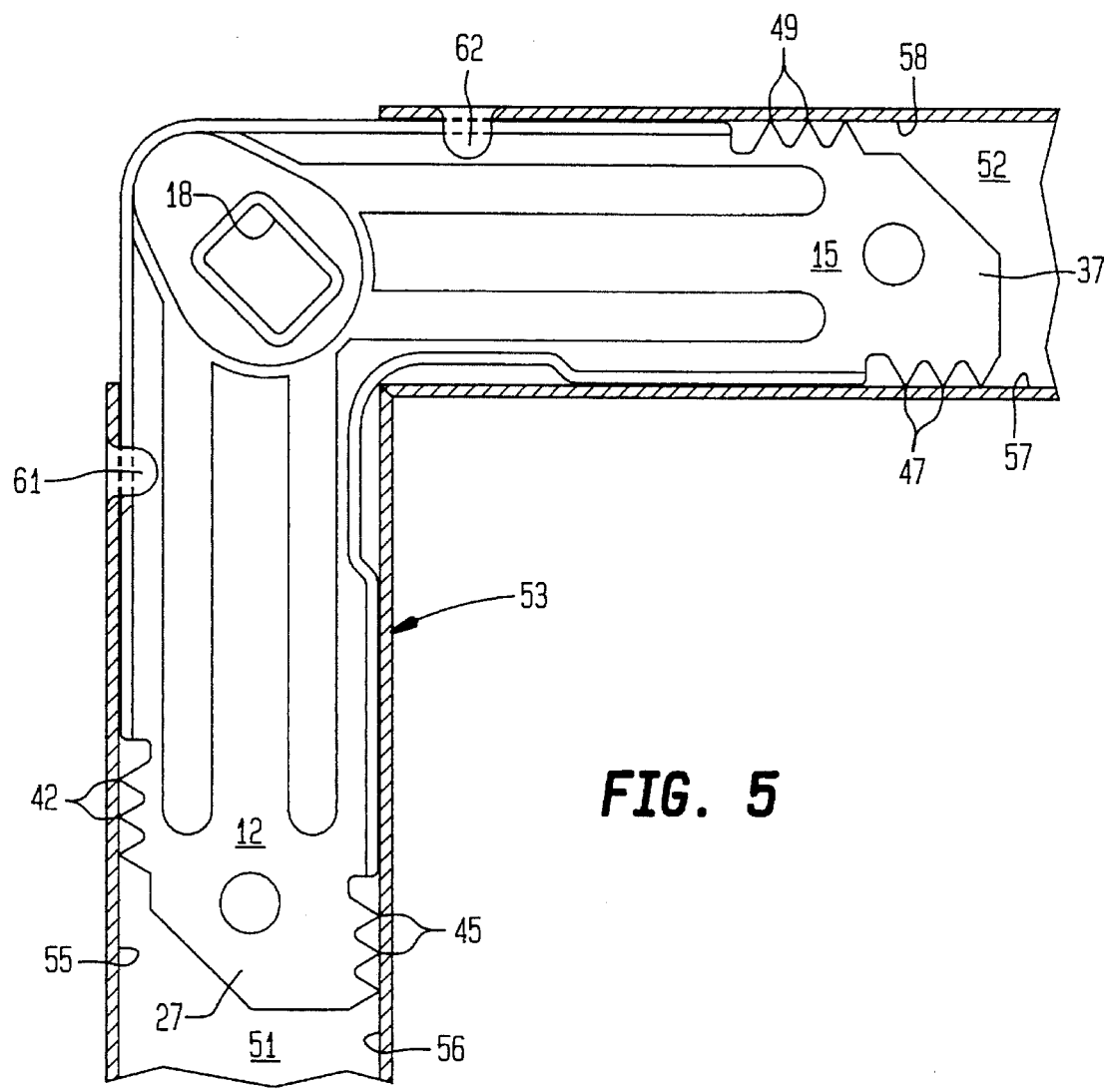
FIG. 5 is a plan view of the angled plate shown in FIGS. 1–4 after being positioned within transverse flanges of a duct section.

An angular plate 11 has a first leg 12 with an inner end portion 33 joined to an inner end portion 14 of a second leg 15. The first leg 12 is joined to the second leg 15 to form an angle $\alpha$ of 90°. Stamped through connected portions of the adjacent inner end portions 13, 14 is a rectangular opening 18.

As shown in FIG. 3, the first leg 12 has a substantially planar top surface 21 and a substantially planar bottom surface 22. Parallel inner and outer edges 24, 25 of the first leg are upwardly turned to form strengthening flanges. The inner and outer edges 24, 25 extend longitudinally between the inner end portion 13 of the first leg 12 and an outer end portion 27 thereof. Additional strengthening of the first leg 12 is provided by a pair of longitudinally extending parallel grooves 28 in the bottom surface 22.

The second leg portion 15 similarly has a planar top surface 31 and a planar top bottom surface 32. Also parallel inner and outer edges 34, 35 of the second leg 15 are upwardly turned to form flanges. The inner and outer edges 34, 35 extend longitudinally from the inner end portion 14 of the second leg 15 to an outer end portion 37 thereof. Again, additional strengthening of the second leg 15 is provided by a pair of longitudinally extending, parallel grooves in the bottom surface 32.

Formed on the outer end portion 27 of the first leg 12 are a plurality of teeth 41 having pointed outer ends 42 that project transversely from the outer edge 25. Also formed on the outer end portion 27 of the first leg 12 are a plurality of teeth 44 having pointed outer ends 45 that project transversely from the inner edge 24. Similarly formed on the outer end portion 37 of the second leg 15 are a plurality of teeth 46 having pointed outer ends 47 that project transversely from the inner edge 34 and a plurality of teeth 48 having pointed outer ends 49 that project transversely from the outer edge 35. Preferably, the pointed outer ends 42, 45, 47 and 49 project transversely from, respectively, the outer edge 25 of the first leg 12, the inner edge 24 of the first leg 12, the inner edge 34 of the second leg 15 and the outer edge 35 of the second leg 15 by a distance d having a range between 0.003 and 0.010 inches.

The angular plate 11 is used to join adjacent duct sections in a manner similar to that described in the above noted U.S. patents. However, deficiencies of prior angular connecting plates are eliminated by the projecting fingers 41, 44, 46 and 48 of the angular plate 11. During assembly, the first and second legs 12, 14, respectively, are pressed into orthogonally related channels 51, 52 at the corner of a duct section 53 (FIG. 5). After full insertion of the angular plate 11, the pointed outer ends 42 on the outer end portion 27 of the first leg 12 penetrate an outer wall 55 of the channel 51 and the pointed outer ends 45 penetrate an inner wall 56 thereof. Similarly, the pointed outer ends 47 on the outer end portion 37 of the second leg 15 penetrate an inner wall 57 of the channel 52 while the pointed outer ends 49 penetrate an outer wall 58, thereof.

The penetration of the channel walls 55, 56, 57 and 58, respectively, by the pointed outer ends 42, 45, 47 and 49 securely retains the angular plate 11 in position within the channels 51, 52. Subsequently, portions 61, 62, of the outer channel walls 55, 58 can be crimped over the outer edges 25, 35 of, respectively, the first and second legs 12, 15 to further secure the annular plate 11 in position. After similar positioning of an angular plate 11 in each corner of the duct section 53, another duct section (not shown) can be aligned therewith and secured thereto by fastening bolts extending through the openings 18 in adjacent pairs of the annular plates 11.

Obviously, many modifications and variations of the present invention are possible in light of the above teachings. It is to be understood, therefore, that the invention can be practiced otherwise than as specifically described.

What is claimed is:

1. An angular sheet metal plate for connecting together channel shaped flanges at the ends of ducts, said angular plate including first and second legs each having substantially planar top and bottom surfaces, an inner end portion of said first leg being joined to an inner end portion of said second leg so as to establish an angle between said first and second legs; and wherein said inner end portions define an opening for receiving a connector, said first leg has substantially parallel and rectilinear inner and outer edges formed by flanges projecting upwardly from said top surface, said flanges extending between an outer end portion and said inner end portion of said first leg, said second leg has substantially parallel and rectilinear inner and outer edges formed by flanges projecting upwardly from said top surface, said flanges extending between an outer end portion and said inner end portion of said second leg, and said outer end portion of at least one of said first and second legs defines projection means projecting in a direction substantially parallel to said planar top and bottom surfaces and beyond at least one of said inner and outer edges of said at least one of said first and second legs.

2. An angular plate according to claim 1 wherein said projection means project transversely from each of said inner and outer edges of said at least one of said first and second legs.

3. An angular plate according to claim 2 wherein said projection means comprise transversely projecting teeth.

4. An angular plate according to claim 3 wherein said teeth have pointed outer ends.

5. An angular plate according to claim 4 wherein said outer end portion of said at least one of said first and second legs defines a plurality of said teeth transversely projecting beyond each of said inner and outer edges thereof.

6. An angular plate according to claim 5 wherein said teeth project beyond said inner and outer edges by a distance of between 0.003 and 0.010 inches.

7. An angular plate according to claim 6 wherein said projection means projects transversely from each of first and second legs.

8. An angular plate according to claim 1 wherein said projection means projects in a direction substantially parallel to said planar top and bottom surfaces and beyond at least one of said inner and outer edges of each of said first and second legs.

9. An angular plate according to claim 8 wherein said projection means project transversely beyond each of said inner and outer edges of each of said first and second legs.

10. An angular plate according to claim 9 wherein said projection means comprise transversely projecting teeth.

11. An angular plate according to claim 10 wherein said teeth have pointed outer ends.

12. An angular plate according to claim 11 wherein said teeth project from said inner and outer edges by a distance of between 0.003 and 0.010 inches.

13. An angular plate according to claim 1 wherein said projection means comprise transversely projecting teeth.

14. An angular plate according to claim 13 wherein said teeth have pointed outer ends.

15. An angular plate according to claim 14 wherein said teeth project from said inner and outer edges by a distance of between 0.003 and 0.010 inches.

16. An angular plate according to claim 1 wherein said projection means project transversely by a distance between 0.003 and 0.010 inches.

17. An angular plate according to claim 1 wherein said angle is substantially 90°.

18. A duct assembly comprising first and second sheet metal ducts having confronting, orthogonally intersecting edges; first and second flanges projecting transversely from, respectively, at least one pair of said intersecting edges of each of said first and second ducts; each of said flanges forming a channel having parallel, rectilinear side walls with facing planar surfaces spaced a given distance apart; and said channels formed at said at least one pair of said intersecting edges retaining an angular sheet metal plate including first and second legs each having substantially planar top and bottom surfaces, an inner end portion of said first leg being joined to an inner end portion of said second leg so as to establish an angle between said first and second legs; and wherein said inner end portions define an opening for receiving a connector, said first leg has substantially parallel and rectilinear inner and outer edges spaced apart substantially said given distance and extending between an outer end portion thereof and said inner end portion of said first leg, said second leg has substantially parallel and rectilinear inner and outer edges spaced apart substantially said given distance and extending between an outer end portion thereof and said inner end portion of said second leg, and said outer end portion of at least one of said first and second legs defines projection means projecting a distance between 0.003 and 0.010 inches in a direction substantially parallel to said planar top and bottom surfaces and beyond at least one of said inner and outer edges of said at least one of said first and second legs so as to penetrate said planar surface of at least one said side wall.

19. An angular plate according to claim 18 wherein said projection means projects in a direction substantially parallel to said planar top and bottom surfaces and beyond at least one of said inner and outer edges of each of said first and second legs.

20. An angular plate according to claim 19 wherein said projection means project transversely beyond each of said inner and outer edges of each of said first and second legs.

21. A duct assembly according to claim 18 wherein said inner and outer edges of each of said first and second legs are formed by flanges projecting upwardly from said top surfaces.

* * * * *